Dec. 10, 1940.  G. H. FELT, JR  2,224,725
BULLDOZER BLADE TILTING DEVICE
Filed Jan. 19, 1939  3 Sheets-Sheet 1
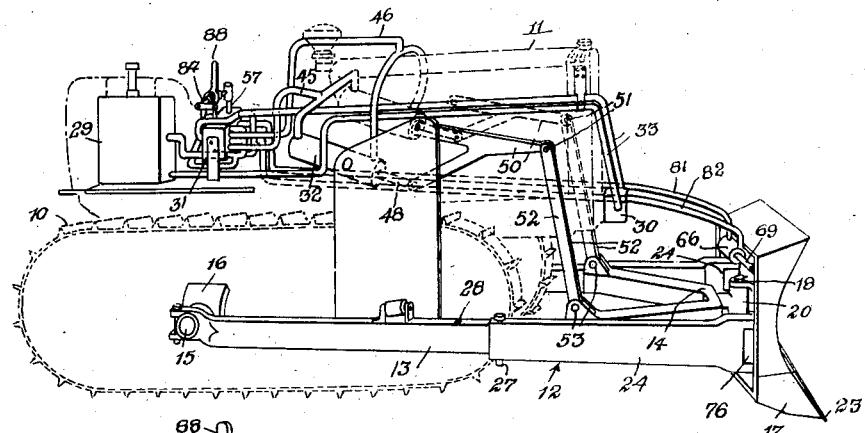
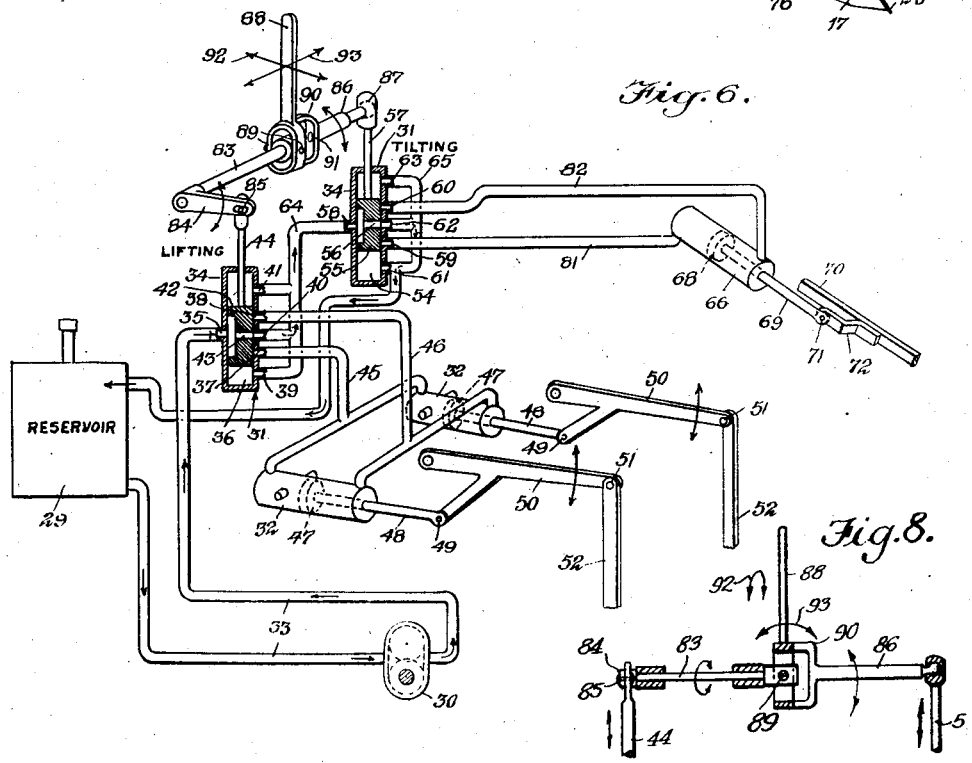
WITNESSES
INVENTOR
George H. Felt Jr
BY
ATTORNEYS Dec. 10, 1940.     G. H. FELT, JR     2,224,725
BULLDOZER BLADE TILTING DEVICE
Filed Jan. 19, 1939     3 Sheets-Sheet 2
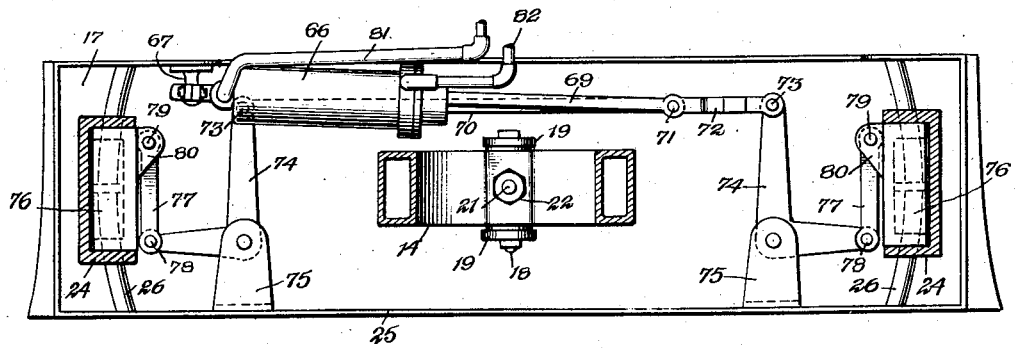
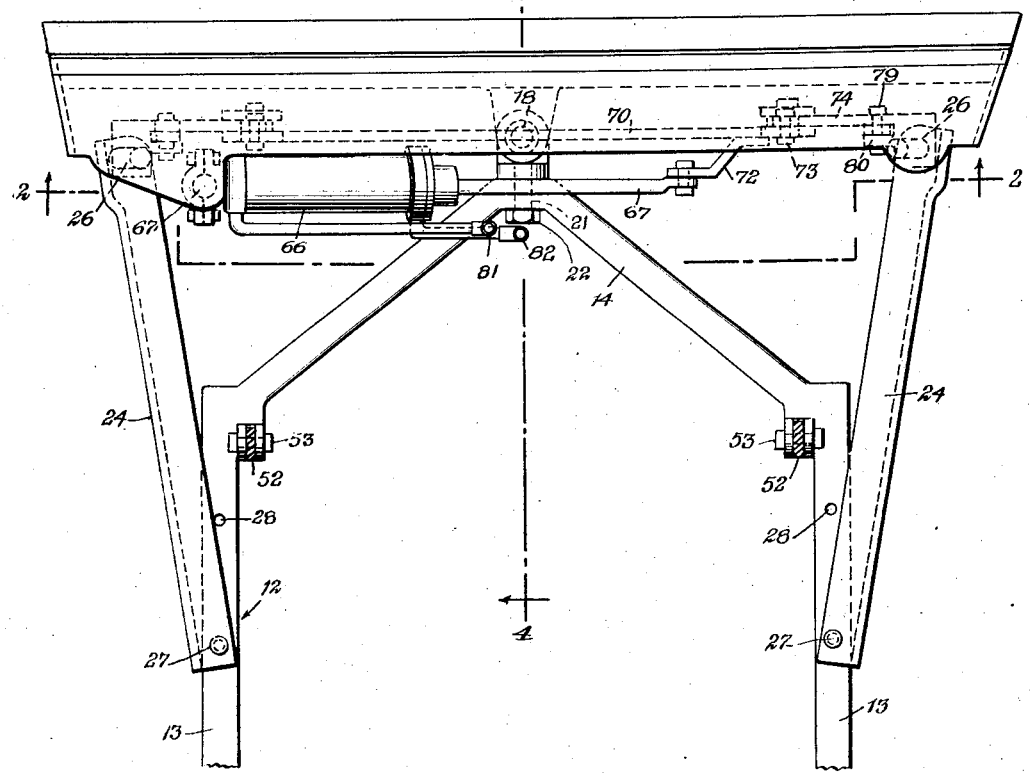
WITNESSES
INVENTOR
George H. Felt Jr.
BY
ATTORNEYS Patented Dec. 10, 1940

2,224,725

UNITED STATES PATENT OFFICE 2,224,725

BULLDOZER BLADE TILTING DEVICE

George H. Felt, Jr., Roseburg, Oreg.

Application January 19, 1939, Serial No. 251,685

7 Claims. (Cl. 37—144)

This invention relates to a device which is designed and adapted to adjust the material moving blade of a machine such as a bulldozer, trail builder, and closely analogous automotive vehicles and tractors used for the purpose of leveling, grading, backfilling, road finishing, ditching, and trail building.

The principal object of the invention is the provision of a device of the indicated character which gives the operator control of the tilting as well as the raising and lowering of the material moving blade.

A further object of the invention is a device as characterized which provides a single manipulatable control lever at the operator's seat with which the material moving blade can be simultaneously tilted and raised or lowered without stopping the machine.

With the foregoing, other objects of the invention will appear from the embodiment thereof described in the following specification, defined as to scope in the appended claims and illustrated by way of example in the accompanying drawings, in which:

Fig. 1 is a perspective view of a bulldozer attached to a tractor shown in dotted lines, selected to illustrate the device of the present invention shown in full lines applied thereto;

Fig. 2 is a sectional view taken on the line 2—2 of Fig. 3 and looking in the direction indicated by the arrows;

Fig. 3 is a plan view showing certain features of the device;

Fig. 6 is a diagrammatic view partly in section of the hydraulic system and lever means for tilting as well as raising and lowering the blade;

Fig. 8 is a view illustrating the connections between parts of the manipulatable control means.

Figure 4:
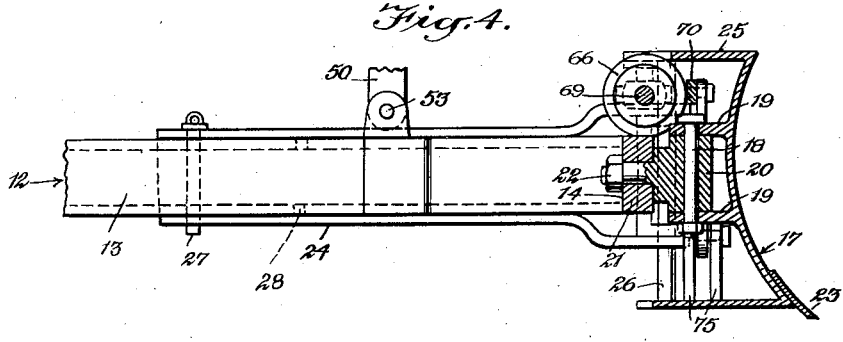
Fig. 4 is a sectional view taken on the line 4—4 of Fig. 3 and looking in the direction indicated by the arrows.

Referring now more particularly to the drawings it will be apparent that there is shown in dotted lines an automotive vehicle 10 in the nature of a tractor which among other things includes a power plant or engine 11. A supporting frame 12 is positioned to extend forwardly. This frame is substantially of U shape and consists of side members 13 in parallel relation to each other and a forward portion 14 connecting said members 13. The rear ends of the members 13 are each pivotally connected as indicated at 15 to a fixed bracket 16 on the running gear of the vehicle. The frame 12 is thus mounted to be raised and lowered on a horizontal axis which is disposed transversely or at a right angle with respect to the longitudinal axis of the vehicle. A mould-board or blade head 17 is disposed transversely of the frame 12 in advance of the portion 14. It is mounted to rock or be canted on an axis perpendicular to the longitudinal axis of the frame 12 by means of a pivot bolt 18 which extends through spaced lugs 19 on the mould-board 17 and projecting rearwardly therefrom, and also through a block 20 positioned between said lugs 19. The block 20 has formed integral therewith or otherwise secured thereto a stud bolt 21 which loosely fits in a hole in the frame portion 14, there being a nut 22 on the stud to hold the block 20 against the portion 14. The stud 21 is disposed at a right angle to the bolt 18 and parallel to the longitudinal axis of the frame 12. So disposed the stud 21 serves as a pivot on which the mould-board may be tilted right and left on an axis disposed at a right angle to the axis on which the frame 12 is raised and lowered.

The mould-board or head 17 carries a blade 23 which projects forwardly and downwardly in continuation of the concaved surface thereof. It is therefore understood that the blade 23 can be raised and lowered by reason of the pivotal movement of the frame 12 on the axis provided by the pivots 15; that it can be canted right and left by reason of the axis provided by the bolt 18; and that it can be tilted right and left by reason of the axis provided by the stud 21.

In order to retain the blade 23 disposed transversely at a right angle to the longitudinal axis of the frame 12 or be retained in right or left canted position with respect to said axis, there are provided channel retaining bars 24 between the side members 13 respectively of the frame 12 and the mould-board 17. The latter has a rectangular rearwardly projecting flange 25. The forward end of each bar 24 is apertured to slidably receive an arcuate rod 26 secured at the opposite ends to the upper and lower portions respectively of the flange 25. The rearward end of each bar 24 carries a pin 27 which is receivable in holes 28 in the related side member 13.

Hydraulic mechanism is employed for the purpose of raising and lowering the frame 12. This mechanism is shown most clearly in Figs. 1 and 6. It includes a reservoir 29 in which the main supply of the oil or other liquid is contained. A pump 30 circulates the liquid or oil under pressure. A valve 31 serves for controlling the flow of oil to pivotally mounted cylinders 32. The pump 30 is connected to be constantly operated by the crankshaft of the engine 11. The pump is connected in a conduit 33 which has one end connected with the outlet of the reservoir 29 and the other end is connected with the casing 34 of the valve 31 in communication with an inlet 35 to one chamber 36 defined by said casing 34. The casing has outlets 37, 38, 39, 40 and 41 respectively which communicate with the chamber 36. A slide 42 operates in the chamber 36 and has a passage or port 43, and a rod 44 which projects exteriorly of the casing. A branched flexible conduit 45 is connected between the outlet 37 and the cylinders 32 for conveying oil to said cylinders for the frame raising operation. A branched flexible conduit 46 is connected between the outlet 38 and the cylinders 32 for conveying oil to the cylinders for the frame lowering operation. Pistons 47 are movable in the cylinders 32 respectively. Each piston 47 has a rod 48 projecting forwardly through one end of its cylinder and said rod is pivotally connected as at 49 with a lever 50 fulcrumed on the vehicle. The lever 50 is pivotally connected as at 51 with one end of a link 52 whose opposite end is pivotally connected as at 53 with a side member 13 on one side of the vehicle, it being understood there is similar provision and arrangement on both sides. When the slide 42 is moved to its down position the port 43 will be in registry with the inlet 36 and the outlet 37. Oil will then flow under pressure from the pump 30 to the cylinders 32 through the conduit 33, inlet 35, port 43, outlet 37, and conduit 45. This will move the pistons 47 forwardly and through the intervention of the rods 48, levers 50 and links 52 will raise the frame 12 and parts carried thereby including the blade. When the slide 42 is moved to its up position bringing the port 43 into registry with the inlet 35 and outlet 38, oil will flow under pressure from the pump 30 to the cylinders 32 through the conduit 33, inlet 35, port 43, outlet 38 and conduit 46. This will cause a reverse operation of the pistons 47, levers 50 and links 52 thereby lowering the frame 12. Return flow of the oil to the reservoir 29 in these operations will be explained hereinafter.

The features hereinabove described are conventional and are important only as employed in conjunction with the present invention.

The present invention contemplates the utilization of the hydraulic mechanism hereinabove described with additions thereto for the purpose of raising and lowering the material moving blade or tilting it selectively or performing both of these operations simultaneously, and in accordance therewith there are provided means as follows:

The valve 31 is of duplex construction. The casing 34 defines a separate chamber 54 in which a slide 55 operates. The slide 55 has a port 56 and a jointed rod 57 which projects exteriorly of the casing 34. The casing has an inlet 58 and outlets 59, 60, 61, 62 and 63, in communication with the chamber 54. A branched conduit 64 establishes communication between the outlets 39, 40 and 41 and the inlet 58. A branched conduit 65 establishes communication between the outlets 61, 62 and 63 and the inlet of the reservoir 29 for return flow of oil thereto. A cylinder 66 has one end connected with the flange 25 of the mould-board by a universal joint 67 or the like, in order that the cylinder may have pivotal movement. A piston 68 operates in the cylinder 66, and has a rod 69 which projects exteriorly of the cylinder end opposite its pivoted end. The outer extremity of the rod 69 is pivotally connected with a connecting rod or link 70 by means of a pivot bolt 71 engaged with an offset 72 fixed to the rod 69. The opposite ends of the rod 70 are pivotally connected as at 73 respectively with bell-crank levers 74 fulcrumed on brackets 75 fixed on the flange 25. Yokes 76 are engaged with the arcuate rods 26 respectively, so that the latter may slide with respect to the former, and said yokes are positioned between the flanges of the bars 24 respectively so as to be immovable with respect to said bars. The yokes 76 are disposed adjacent the levers 74 respectively, and a link 77 has one end pivotally connected as at 78 with each of the levers 74 and its opposite end pivotally connected as at 79 with a lug 80 projecting from the related yoke 76.

Now in looking at Fig. 2, in which the blade is disposed horizontal, it will be seen that movement of the piston 68 to the left will cause the blade to tilt down toward the right side, because the lugs 80 being the stationary parts cause the right lever 74 to bear down on its brackets 75 and the left lever 74 to pull up on its bracket 75, as the rod 70 moving longitudinally to the left causes the levers 74 to move in unison counter-clockwise on their fulcrums, the links 77 contributing in the operation by resisting the pivotal movement of the levers 74. By moving the piston 68 to the right, a reverse operation of the parts will occur with the result that the blade will be tilted down toward the left side.

Figure 5:
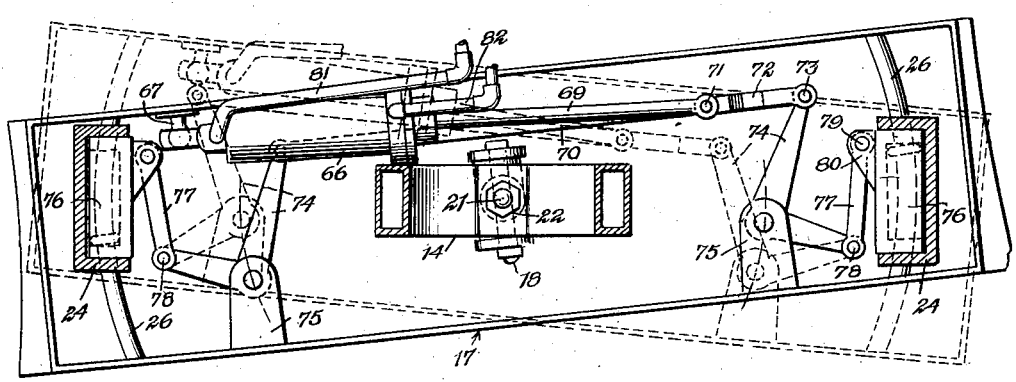
Fig. 5 is a view similar to Fig. 2 but showing the blade tilted to the right and corresponding disposition of the tilting means all in dotted lines, and also showing the blade tilted to the left and corresponding disposition of the tilting means in full lines.

The movement of the piston 68 is accomplished as follows: A conduit 81 flexible in whole or in part establishes communication between the outlet 59 and the interior of the cylinder 66 at one end, and another like conduit 82 establishes communication between the outlet 60 and the interior of the cylinder 66 at the other end. When the slide 55 is moved to its down position the port 56 will be in registry with the inlet 58 and the outlet 59 permitting oil under pressure to flow from the pump 30 through conduit 33, inlet 35, port 43, conduit 64, inlet 58, port 56, outlet 59 and conduit 81 to the cylinder 66. This will cause the piston 68 to move to the right as viewed in Fig. 5, and cause the blade 23 to tilt down at the left as shown in full lines. When the slide 55 is moved to its up position the port 56 will be in registry with the inlet 58 and the outlet 60 permitting oil under pressure to flow from the pump 30 through conduit 33, inlet 35, port 43, conduit 64, inlet 58, port 56, outlet 60 and conduit 82 to the cylinder 66. This will cause the piston 68 to move to the left and cause the blade 23 to tilt down at the right as shown in dotted lines in Fig. 5. It is understood that the stud bolt 21 provides the axis on which the blade tilts.

When the slides 42 and 55 are in their intermediate positions, the port 43 of the slide 42 will be in registry with the inlet 35 and the outlet 40, whereas the port 56 of the slide 55 will be in registry with the inlet 58 and the outlet 62. This will permit free circulation of the oil in the system while the pump 30 is in operation by the engine 11. The arrows on the conduits 33, 64 and 65 indicate the direction of flow of the oil in Fig. 6, which latter also illustrates the intermediate position of the valve slides. Under this condition the frame 12 and blade will be held in the position to which they have been adjusted. Back flow of oil from the cylinders 32 is prevented by the slides 42 and 55 when in their intermediate position as appears in Fig. 6. However, when the slide 42 is in its down position to raise the frame 12, oil will be permitted to return flow from the cylinders 32, through outlet 41, conduit 64, inlet 58, port 56, conduit 65 to the reservoir 29. When the slide 42 is in its up position to lower the frame 12, oil will be permitted to return flow from the other ends of the cylinders 32 through outlet 39, conduit 64, etc., as set forth above. When the slide 55 is in its down position to cause the blade to tilt down toward the left, oil will be permitted to return flow from the cylinder 66 through conduit 82, outlet 60, chamber 54, outlet 63, conduit 65 to the reservoir 29. When the slide 55 is in its up position to cause the blade to tilt down toward the right, oil will be permitted to return flow from the other end of the cylinder 66, through conduit 81, outlet 59, chamber 54, outlet 61, conduit 65 to the reservoir 29. By return flow, as used hereinabove, is meant the free flow of oil from one end of each cylinder as oil under pressure is being forced in its opposite end to positively effect the movement of the piston therein for the desired adjustment of the frame 12 and/or blade 23, as the case may be.

In order to effect the desired movement of the slides 42 and 55 to control the flow of oil for the intended adjustment of the frame 12 and blade 23, there are provided means as follows: A rotatory rod 83 has an arm 84 which has a pin and slot connection 85 with the upper end of the rod 44. A rotatable and tiltable rod 86 has one end thereof connected with the upper end of the rod 57 by a universal joint 87. A manipulatable control lever 88 is pivotally connected as at 89 with the end of the rod 83 opposite that having the arm 84. The lever 88 has an offset 90 rigidly connected as at 91 with the end of the rod 86 opposite that having the joint 87. By manipulating the lever 88 in the directions indicated by the arrow 92, the slide 42 may be moved up or down to raise or lower the frame 12 without moving the slide 55 and hence without affecting the adjustment of the blade 23. By manipulating the lever 88 in the directions indicated by the arrow 93, the slide 55 may be moved up or down to tilt the blade 23 left or right without moving the slide 42 and hence without affecting the adjustment of the frame 12. It is to be understood that the blade 23 may be readily brought to a horizontal position by moving the slide 55 to its intermediate position after the piston 68 has been moved one way or the other to bring the blade 23 in the horizontal position.

The lever 88 may be manipulated to simultaneously turn the rod 83 and tilt the rod 86 thereby moving the slides 42 and 55 at the same time. As a consequence the blade 23 may be tilted as desired while the frame 12 is being raised or lowered.

Figure 7:
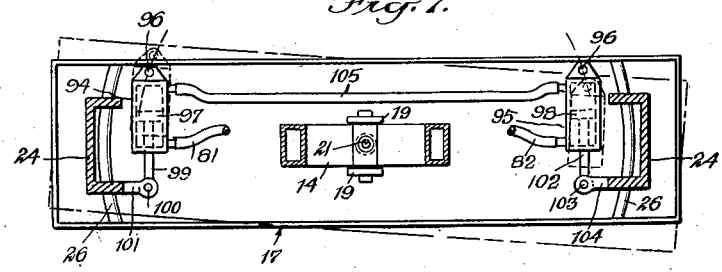
Fig. 7 is a view similar to Fig. 2 but showing a modified form of blade tilting means.

In Fig. 7 there is shown a modified form of blade tilting means. Use is made of cylinders 94 and 95 respectively. Each of these cylinders has its upper end pivotally connected as at 96 with the mould-board 17. Pistons 97 and 98 are disposed in the cylinders 94 and 95 respectively. The piston 97 has a rod 99 which projects downwardly through the free end of the cylinder 94 and is pivotally connected as at 100 with a lug 101 on the adjacent bar 24. Likewise, the piston 98 has a rod 102 which is pivotally connected as at 103 with a lug 104 on the other bar 24. The upper ends of the cylinders 94 and 95 are connected by a conduit 105 to establish communication between the interiors thereof to equalize pressure therein. The conduit 81 is connected with the lower end of the cylinder 94 to convey oil thereinto, whereas the conduit 82 is connected with the lower end of the cylinder 95 to convey oil thereinto. Oil under pressure pumped through conduit 81 will enter the lower end of the cylinder 94 against the piston 97 and will react on the lower end of the cylinder 94 causing the mould-board and its blade 23 to tilt down toward the left. Oil under pressure pumped through conduit 82 will enter the lower end of the cylinder 95 against the piston 98 and will react on the lower end of the cylinder 95 causing the mould-board and its blade 23 to tilt down toward the right, as indicated in dot and dash lines in Fig. 7.

It is to be understood that details of construction may be modified and rearranged without departing from the spirit of the invention as defined in the claims.

I claim:

1. A tilting device of the character disclosed comprising adjustable side bars, a tiltable material moving element connected with said bars so as to be moved to different angular positions with respect to said bars upon adjustment of the latter, levers fulcrumed on said element, links pivotally connected with said levers respectively and pivotally connected with said bars respectively, a rod whose opposite ends are pivotally connected respectively with said levers, and means connected with said element and rod to move the rod in opposite directions to operate said levers to tilt said element.

2. A material moving device for use with a tractor or analogous vehicles, comprising an angularly adjustable frame, a blade tiltably mounted on the front end of said frame, and mechanism operable to tilt said blade, said mechanism including levers connected respectively with opposite sides of said frame and with the blade, a rod having its opposite ends pivotally connected respectively with said levers, and hydraulic means connected with said rod and blade to cause the rod to move longitudinally in opposite directions.

3. A tilting device of the character disclosed comprising a frame, a material moving element tiltably mounted on the frame, levers fulcrumed on said element, links pivotally connected with said levers respectively and pivotally connected with said frame at opposite sides thereof respectively, a rod whose opposite ends are pivotally connected respectively with said levers, and means connected with said element and rod to move the rod in opposite directions to operate the levers and links to tilt said element.

4. A tilting device of the character disclosed comprising a frame, a material moving element tiltably mounted on the frame, levers fulcrumed on said element, links pivotally connected with said levers respectively and pivotally connected with said frame at opposite sides thereof respectively, a rod whose opposite ends are pivotally connected respectively with said levers, a fluid cylinder having one of its ends pivotally connected with said element, a piston movable in said cylinder and having a rod projecting through the other end of the cylinder, the outer end of the piston rod being pivotally connected with said first rod, and conduits connected with the opposite ends respectively of said cylinder to convey fluid under presure to the interior of said cylinder to operate the piston, first rod, levers and links to tilt said element.

5. In a device of the character disclosed, in combination with an automotive vehicle, a frame connected with the vehicle to have pivotal movement, a material moving blade tiltably connected with the frame, and hydraulic mechanism to raise and lower the frame and also to tilt the blade, said mechanism including a cylinder and a piston operable therein, means connecting the cylinder with the blade, and means connecting the piston with the blade and frame.

6. In a device of the character disclosed, in combination with an automotive vehicle, a frame connected with the vehicle to have pivotal movement, a material moving blade tiltably connected with the frame, and hydraulic mechanism to raise and lower the frame and also to tilt the blade, said mechanism including a cylinder and a piston operable therein at each end of the blade and said cylinder and piston being pivotally connected respectively by suitable means with the blade and frame between the same.

7. In a device of the character disclosed, in combination with an automotive vehicle, a frame connected with the vehicle to have pivotal movement, a material moving blade tiltably connected with the frame, and hydraulic mechanism to raise and lower the frame and also to tilt the blade with respect to said frame, said mechanism including a cylinder and a piston operable therein, and said cylinder and piston being pivotally connected respectively by suitable means with the blade and frame between the same.

GEORGE H. FELT, JR.